US010491372B2

(12) United States Patent
Wurcker et al.

(10) Patent No.: US 10,491,372 B2
(45) Date of Patent: Nov. 26, 2019

(54) PROTECTION METHOD AND DEVICE AGAINST A SIDE-CHANNEL ANALYSIS

(71) Applicant: ESHARD, Martillac (FR)

(72) Inventors: Antoine Wurcker, Villenave d'Ornon (FR); Hugues Thiebeauld De La Crouee, Pessac (FR)

(73) Assignee: ESHARD, Martillac (FR)

( * ) Notice: Subject to any disclaimer, the term of this patent is extended or adjusted under 35 U.S.C. 154(b) by 184 days.

(21) Appl. No.: 15/636,216

(22) Filed: Jun. 28, 2017

(65) Prior Publication Data

US 2017/0373829 A1 Dec. 28, 2017

(30) Foreign Application Priority Data

Jun. 28, 2016 (EP) .................................... 16176716
Jun. 28, 2016 (EP) .................................... 16176717

(Continued)

(51) Int. Cl.
*H04L 9/00* (2006.01)
*H04L 9/06* (2006.01)
(Continued)

(52) U.S. Cl.
CPC ............... *H04L 9/002* (2013.01); *G09C 1/00* (2013.01); *H04L 9/0631* (2013.01);
(Continued)

(58) Field of Classification Search
CPC ......... H04L 9/002; H04L 9/14; H04L 9/0861; H04L 9/0631; H04L 2209/08; H04L 2209/04; H04L 2209/12; G09C 1/00
See application file for complete search history.

(56) References Cited

U.S. PATENT DOCUMENTS 6,278,783 B1 * 8/2001 Kocher ................. G06F 21/556
380/277
8,625,780 B2 * 1/2014 Peter ......................... G06F 7/00
380/28

(Continued)

FOREIGN PATENT DOCUMENTS

EP  1267514 A2  12/2002
EP  1601132 A1  11/2005

(Continued)

OTHER PUBLICATIONS

Extended European Search Report from EP Appn. No. 16176714.0, dated Jan. 3, 2017, 6 pages.

(Continued)

*Primary Examiner* — Matthew Smithers
(74) *Attorney, Agent, or Firm* — Brake Hughes Bellermann LLP

(57) ABSTRACT

A method for executing, by a circuit, an operation combining first and second input data and providing an output data of the same size, may include generating from the first input data a first input set including all possible data in relation to a size of the first data, generating from the second input data a second input set including all possible data in relation to a size of the second data, and applying the operation to each pair of data including a data of the first input set and a data of the second input set, an output set of the operation including data resulting from the application of the operation to each of the pairs of data.

27 Claims, 6 Drawing Sheets

(30) Foreign Application Priority Data

| Jun. 28, 2016 | (EP) | 16176718 |
| Jun. 28, 2016 | (EP) | 16176719 |
| Jun. 28, 2016 | (EP) | 16176721 |

(51) Int. Cl.
*H04L 9/08* (2006.01)
*H04L 9/14* (2006.01)
*G09C 1/00* (2006.01)

(52) U.S. Cl.
CPC .............. *H04L 9/0861* (2013.01); *H04L 9/14* (2013.01); *H04L 2209/04* (2013.01); *H04L 2209/08* (2013.01); *H04L 2209/12* (2013.01)

(56) References Cited

U.S. PATENT DOCUMENTS

| 2001/0053220 | A1 | 12/2001 | Kocher et al. | |
| 2005/0259814 | A1* | 11/2005 | Gebotys | H04L 9/003 380/28 |
| 2006/0056622 | A1 | 3/2006 | Liardet et al. | |
| 2007/0076890 | A1 | 4/2007 | Muresan et al. | |
| 2007/0160196 | A1* | 7/2007 | Timmermans | G06F 7/00 380/28 |
| 2008/0019503 | A1* | 1/2008 | Dupaquis | H04L 9/0625 380/28 |
| 2008/0240443 | A1* | 10/2008 | Vuillaume | H04L 9/3247 380/277 |
| 2009/0074181 | A1* | 3/2009 | Pelletier | H04L 9/003 380/29 |
| 2012/0250854 | A1 | 10/2012 | Danger et al. | |
| 2014/0351603 | A1* | 11/2014 | Feix | H04L 9/003 713/189 |
| 2015/0169904 | A1* | 6/2015 | Leiserson | G06F 21/71 713/189 |
| 2016/0269175 | A1* | 9/2016 | Cammarota | G09C 1/00 |
| 2017/0104586 | A1* | 4/2017 | Hars | H04L 9/0637 |
| 2017/0244552 | A1* | 8/2017 | Thiebeauld De La Crouee | H04L 9/002 |
| 2017/0373829 | A1* | 12/2017 | Wurcker | H04L 9/002 |
| 2017/0373832 | A1* | 12/2017 | Wurcker | H04L 9/002 |
| 2017/0373838 | A1* | 12/2017 | Wurcker | H04L 9/002 |

FOREIGN PATENT DOCUMENTS

| GB | 2443355 | * | 4/2008 | ............... H04L 9/06 |
| WO | 0108012 | A1 | 2/2001 | |

OTHER PUBLICATIONS

Extended European Search Report from EP Appn. No. 16176717.3, dated Jan. 3, 2017, 6 pages.
Extended European Search Report from EP Appn No. 16176721.5, dated Jan. 3, 2017, 7 pages.
Extended European Search Report from EP Appn. No. 16176716.5, dated Jan. 3, 2017, 7 pages.
Extended European Search Report from EP Appn No. 16176719.9, dated Jan. 5, 2017, 8 pages.
Extended European Search Report from EP Appn. No. 16176718.1, dated Dec. 22, 2016, 9 pages.
Bruneau, Nicolas , et al., "Multi-Variate Higher-Order Attacks of Shuffled Tables Recomputation", http:// eprint.acr.org/2015/837.pdf, retrieved May 9, 2016, 20 pages.
Coron, Jean-Sebastien , "Higher Order Masking of Look-up Tables", International Association for Cryptologic Research, vol. 2014025:092212, Feb. 5, 2014, 22 pages.
Herbst, Christoph , et al., "An AES Smart Card Implementation Resistant to Power Analysis Attacks", Applied Cryptography and Network Security Lecture Notes in Computer Science; LNCS, Jan. 1, 2006, 14 pages.
Itoh, Kouichi , et al., "DPA Countermeansure Based on the "Masking Method"", ICICS 2001, LNCS 2288, 2002, pp. 440-456.

* cited by examiner

PROTECTION METHOD AND DEVICE AGAINST A SIDE-CHANNEL ANALYSIS

CROSS REFERENCE TO RELATED APPLICATIONS

This application claims priority to European Application Numbers, EP16176716.5, EP16176717.3, EP16176718.1, EP16176719.9, EP16176721.5, each filed Jun. 28, 2016, the disclosures of which are incorporated herein by reference.

TECHNICAL FIELD

The present disclosure relates to a method and device for protecting a circuit or a program against side channel analysis and provide a value of a secret data handled by the circuit or program, and in particular a circuit for transforming a message by an encryption or decryption algorithm using a secret key.

The present disclosure also relates to devices implementing cryptographic algorithms, such as secure devices (smart card integrated circuits), hardware cryptographic components integrated onto mother boards of computers and other electronic and IT equipment (USB drives, TV decoders, game consoles, etc.), or the like.

The present disclosure also relates to circuits implementing a cryptographic algorithm such as AES (Advanced Encryption Standard). The present disclosure also relates to a program implementing such an algorithm, provided for being executed in a secure or non-secured environment.

The present disclosure also relates to circuits and software implementing an operation combining two data which are required to be kept hidden.

BACKGROUND

Circuits implementing cryptographic algorithms can include a central processing unit (CPU), and a circuit dedicated to cryptographic computing, for example a cryptographic coprocessor. These circuits may include thousands of logic gates that switch differently according to the operations executed. These switching operations create short variations in current consumption, for example of a few nanoseconds, and those variations can be measured. In particular, CMOS-type integrated circuits include logic gates that only consume current when they switch, i.e., when a logic node changes its state to 1 or to 0. Therefore, the current consumption depends on data handled by the central processing unit CPU and on its various peripherals: memory, data flowing on the data or address bus, cryptographic coprocessor, etc.

Furthermore, certain software programs using encryption or obfuscation techniques, such as the White-box Cryptography technique, may integrate secret data in such a way that it is very difficult to determine data by reverse engineering. Certain software programs may also receive a secret data from outside through a secure communication channel.

Such circuits may be subjected to so-called side channel analysis attacks based on observing current consumption, magnetic or electromagnetic radiation. Such attacks provide secret data, in particular encryption keys. Current side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. SPA analysis provides information about the activity of the integrated circuit by observing part of the current consumption trace corresponding to a cryptographic computation, since the current consumption trace varies according to operations executed and data handled. Software may also undergo such side channel attacks during their execution by a circuit.

DPA and CPA analyses enable the key of an encryption algorithm to be found by acquiring numerous circuit consumption traces and by statistically analyzing these traces to find the target information. DPA and CPA analyses can be based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of a stray capacitance of a MOS transistor). Alternatively, the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used in order to develop a consumption model that does not require knowledge of the structure of the integrated circuit in order to be applicable. DPA analysis involves amplifying this consumption difference using statistical processing on numerous current consumption traces, aiming to highlight a measurement difference between two types of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on data to be discovered that is handled by the microcircuit and on the value of the encryption key.

Electromagnetic analysis (EMA) is based on the principle that an integrated circuit may send information in the form of near or far field electromagnetic radiation. Given that transistors and the wires connecting the transistors emit electromagnetic signals when their state changes, these signals can be treated like the current consumption variation signals by an analysis such as one of SPA, DPA and CPA analyses. Other side channel analyses exist, such as "Template analysis" and "Mutual Information Analysis" (MIA). All of the above-mentioned analyses are based on a time alignment of all the analyzed traces. In other words, all the measurements performed at a given time, e.g., from the time the execution of a command is activated by the circuit, must correspond to the same data handled by the algorithm.

SUMMARY

In one general aspect, a method for executing by a circuit an operation whereby a first input data is combined with a second input data may include defining data pairs whereby each data of a first input set is associated with each data of a second input set, the first input set including the first input data, each data in the first set including at least one word, the words in the first input set having a same size and forming a first word subset including a single word from each data of the first input set and a same number of occurrences of all possible values of the words, the second input set including the second input data, each data in the second input set including at least one word, the words in the second input set having a same size and forming a second word subset including a single word from each data of the second input set and a same number of occurrences of all possible values of the words, and applying the operation to each of the data pairs, an output set of the operation including all data resulting from the application of the operation to one of the data pairs. An output data resulting from the application of the operation to the first and second input data can have a position in the output set, which is known from the circuit.

Implementations can include one or more of the following features. For example, the data in the output set may be arranged in rows and columns. The data of one row or column resulting from the application of the operation to a same one data of one of the first and second input sets and to each of the data in the other of the first and second input sets. The method may include selecting a row or a column of the output set including the output data.

The output set may be written in a memory area including two lines of data. One of the two lines of data including output data resulting from the application of the operation to the first input data and to each of the data in the second input set, or resulting from the application of the operation to the second input data and to each of the data in the first input set.

The rows or columns of the output set may be written in the lines of the memory area randomly or alternately, and when a row or column of the output data including the output data at a known position may be written in one of the lines of the memory area, the other line of the memory area may receive all the output data of the output set subsequently computed. The method may include selecting as output of the operation the line of the memory area including the expected output data, or the rows or columns of the output set may be combined by XOR operations with previous data written in one of the lines of the memory area, except one row or column of the output set, which may be written in the other of the lines of the memory area, an error being detected when the two lines of the memory area are not identical.

The operation may be an Exclusive OR (XOR) operation. The computations of the data in the output set may be performed in a random order.

The method may further include detecting in a column or a row of the output set a data having a number of occurrences different from a number of occurrences of other data in the output set. An error may be detected when two data with different numbers of occurrences are found in a column or a row of the output set.

The detection of two identical data in a row or column of the output set can include combining by XOR operations all the data in the row or column of the output set, and comparing the result of the XOR operations with zero.

The first input set may be generated by combining by Exclusive OR operations the first input data once with each possible values of a mask having a same bit number as the first input value.

The method may further include concatenating a number of data of the first input set to generate a first input word, concatenating a same number of data of the second input set to generate a second input word, and applying the operation to the first and second input words.

In another general aspect, a method for encrypting or decrypting an input data, may include applying Exclusive OR operations to each byte of the input data and to a corresponding byte of a key derived from a secret key and providing for each byte of the input data a first output set of output bytes including a same number of occurrences of all possible values of a byte including the result of the operation applied to the byte of the input data, applying a substitution operation to each byte of each first output set, including selecting a byte in a substitution table as a function of the byte in the first output set, and providing for each first output set a second output set including all bytes selected in the substitution table as a function of a byte in the first output set, and applying to the second output sets a permutation operation including combining together by Exclusive OR operations bytes of the second output sets or multiples thereof, the XOR operations being performed according to the above-defined method.

Implementations can include one or more of the following features. For example, the first output sets may be generated by generating an input set for each byte of the input data by combining by Exclusive OR operations the byte of the input data once with all possible values of a mask byte, and by combining each byte of the derived key by the Exclusive OR operations with each byte of a corresponding one in the input sets, or generating a key set for each byte of the derived key by combining by Exclusive OR operations the byte of the derived key once with all possible values of the mask byte, and by combining each byte of the input data by the Exclusive OR operations with each byte of a corresponding one in the key sets, or combining by Exclusive OR operations each byte of the input data with a corresponding byte of the derived key to generate output bytes, and by combining each output byte by s Exclusive OR operations once with all possible values of the mask byte.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

DETAILED DESCRIPTION

In view of the drawbacks and considerations noted above, it may be desirable to propose a protection for an integrated circuit or a software program against one or more of these side channel analyses.

For instance, such circuits against side channel analysis may be described in French Patent application no. FR16 51443 filed on Feb. 22, 2016 by Applicant, which discloses a method for analyzing traces representative of the activity of a circuit when the latter executes an operation successively on different input data. This method may include extracting a part of each trace, and generating a histogram from each extracted trace part, by counting an occurrence number of each possible value appearing in each of the extracted parts of these traces. Partial results of the operation may then be computed by applying the operation to each input data and each possible value of a part of a secret key involved in the operation. The method may then identify for each possible part value of the secret key, all the input data which provide the same partial result. For each possible part value of the secret key, the occurrence numbers in the histograms, corresponding to the identified input data and the part value of the secret key may then be added. The part of the secret key can be determined by subjecting the added occurrence numbers to a statistical analysis. The statistical analysis may assume that if a value related to the secret key has leaked in the extracted parts of the traces, it can be highlighted by the added occurrence numbers.

Example embodiments may relate to a circuit including a processor and configured to implement the above-defined methods. The circuit may include a co-processor.

Example embodiments may also relate to a device including a circuit arranged on a medium, such as, for example, a plastic card.

Example embodiments may also relate to a computer program product loadable into a computer memory and including code portions which when executed by a computer configure the computer to carry out the steps of the above-defined methods.

Figure 1:
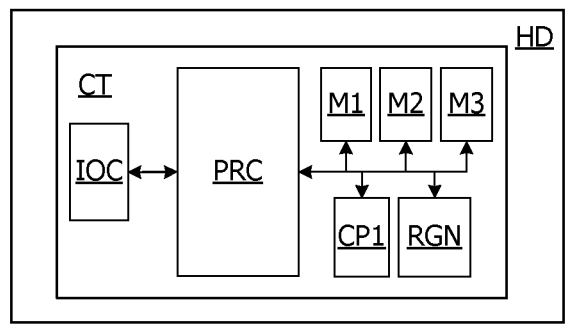
FIG. 1 illustrates a conventional architecture of a secure circuit.

FIG. 1 illustrates a secure integrated circuit (CT), for example arranged on a portable medium HD such as a plastic card or any other medium, or in a terminal such as a mobile terminal. The integrated circuit can include a microprocessor (PRC), an input/output circuit (IOC), memories (M1, M2, M3) coupled to the microprocessor by a data and address bus and, optionally, a cryptographic computation coprocessor (CP1) or arithmetic accelerator, and a random number generator (RGN). The memories can include a volatile memory M1, for example a RAM-type ("Random Access Memory") memory containing volatile application data, a non-volatile memory M2, for example an EEPROM or Flash memory, containing non-volatile data and application programs, and possibly a read-only memory M3 (or ROM memory) containing the operating system of the microprocessor. The operating system can also be stored in the non-volatile memory.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an Near-Field Communications (NFC) controller, or a main circuit of a terminal such as a mobile terminal or a connected object.

In some implementations, the integrated circuit CT may be configured to execute operations of encrypting, decrypting or signing messages that may be sent to the integrated circuit CT, using a cryptographic function. This cryptographic function may be executed by the processor PRC of the circuit CT or partially or totally carried out by the processor PRC to the coprocessor CP1.

Example embodiments as described herein propose protection methods for an operation, (e.g., an operation which may be part of a cryptographic algorithm against side channel analysis). Accordingly, the operation may receive an input data, and may provide an output data as a function of a value of the input data. In some implementations, a protection according to an example embodiment involves executing the operation to be protected for all the data of an input set of data. Each data in the input set including at least one word, wherein the words in the input set having a same size and forming a word subset including a same number of occurrences of all possible values of one word in relation to the word size. Thus, the input set may include the input data required to be processed by the operation. In other implementations, the protection may involve providing as a result of the operation an output set of data in which each data includes at least one word. The words in the output set may have a same size and may form a word subset including the same number of occurrences of all possible values of one word in relation to the word size.

The set of input data may be obtained by combining the required input data X by a logical XOR (Exclusive OR) operation with a mask Mi including for example a value equal to i representing a byte having all possible values of one byte (between 0 and 255). Thus, if the input data X has the size of one byte, the set of input data may include 256 data equal to $X \oplus Mi$ where Mi=0 to 255, and the required input data $X=XVn=X \oplus Mn$, with Mn=0 ("$\oplus$" representing the XOR operator applied to bytes). When the input data is encoded on one byte, an operation can be protected according to an example embodiment by applying the operation to all the data in the input set including the data $XVi=X \oplus Mi$, with i=0 to 255, i.e., all possible data having the size of one byte. The computations of the output data in the output set may be performed in a random order. To this purpose, the data in the input set can be arranged in a random order.

Unlike the protections of prior circuits which involves hiding the operation to be protected in a flood of identical operations applied to random data and, thus, uncorrelated from the required input data of the operation to be protected, example embodiments herein are to execute the operation on other data not chosen randomly. Indeed, such other data may be correlated to the required input data insofar as the input set formed of such other data and of the required data to be processed is such that each data in the input set may include at least one word. The words in the input set may have the same size and may form a word subset or column including a single word from each data in the input set and a same number of occurrences of all possible values of one word in relation to the word size. As described herein, "word" may designate a group of bits in a data, and "word column" may designate a subset in a data set including a single word from all data in the data set, all the words in the word column having the same size. The words forming a word column may not be necessary aligned, i.e., do not necessary include the same bit positions in the data of the data set. The input data to be processed by the operation may have an unpredictable position in the input set, but known by the circuit performing the operation.

Figure 2:
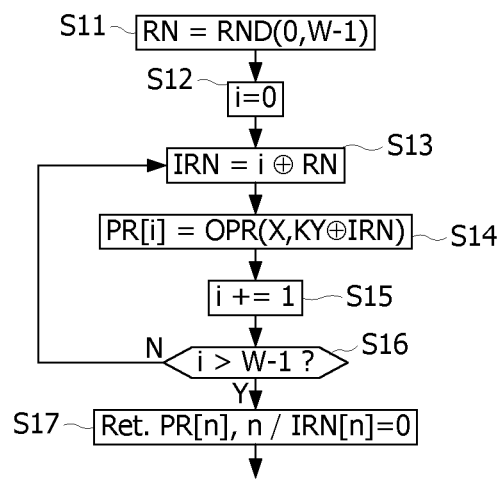
FIG. 2 illustrates an operation including protection steps according to an example embodiment.

FIG. 2 illustrates steps (operations, functions, processes, etc.) S11 to S17 of computing an operation OPR to be protected, which involves a secret data KY, according to an example embodiment. In an embodiment, a processing unit may first execute steps S11 to S16 successively. In this example, at step S11, a variable RN may receive a random value between 0 and a maximum value W−1 determined according to the size defined by the number of bits used to encode this variable in binary code. Therefore, for a variable RN encoded on b bits, the maximum value W may equal 2b. If the variable RN is encoded on 8 bits, the value W may equal 256, and if the variable RN is encoded on 16 bits, the value W may equal 65536. In step S12, an index i may be set to 0. In step S13, a variable IRN (=i⊕) RN) may be computed by combining the index i with the variable RN by an XOR operation. In step S14, one output data PR[i] designated by the index i in a result table PR, may be computed by applying the operation OPR as defined above, to an input data X, and to the secret data KY. According to an example embodiment, the secret data KY may be combined for example by an XOR operation with the variable IRN:

$$PR[i]=OPR(X,KY \oplus IRN). \quad (1)$$

Alternatively, the variable IRN may be combined with the input data X:

$$PR[i]=OPR(X \oplus IRN,KY) \quad (2)$$

or with the result of the operation OPR:

$$PR[i]=OPR(X,KY) \oplus IRN \quad (3)$$

In step S15, the index i may be incremented by formula (1) of above. In step S16, the index i may be compared with the maximum value W, and if it is lower than the value W, a new iteration of the calculation may be executed in steps S13 to S16. In the opposite case, step S17 is executed. In step S17, the table PR may be provided as the result of the operation OPR, the expected output data may be in the table PR at an index i=n, the index n having a value such that the variable IRN=n⊕RN=0, i.e. n=RN, if the combination operation with the value IRN in step S14 is a XOR operation. Indeed, the result of the XOR operation applied to data D and 0 does not transform the data D.

It is noted that values of the variable IRN can be processed in a random order and not necessarily in the order from 0⊕RN to (W−1)⊕RN. Further, the expected output data OPR(X,KY) in the table PR can be extracted, in step S17, only after other operations are applied to the data in the output table PR. In this case, all the data stored in the table PR can be processed by such other operations. Therefore, in the example of AES algorithm, the operation OPR may be for example the XOR operation, which may combine an input data to encrypt with a first derived key used in a first round of the algorithm. The following operations of AES algorithm can be executed on all the data stored in the table PR, and the successive results of these operations stored in the table PR. Therefore, the operations of shifting rows can be applied to each element of the table PR. The expected output data can be extracted from the result table PR at a subsequent step in the processing.

Further, the input data X and the secret data KY may be encoded on respective binary words having the same number of bits. Each value given to the variable IRN may have the same number of bits as the data X and KY. If the data X and KY are encoded on one byte (8-bit words), the variable IRN may also be encoded on 8 bits. The number of iterations W that must be executed between steps S13 to S16 may be equal to 2b, b being the size in number of bits of the data M and X. If the data M and X are encoded on one word of 16, 32 or 64 bits, it may be desirable to limit the number of iterations.

If the operation performs byte per byte, the variable IRN may be encoded on 8 bits, and the operations of combining the secret data KY or the input data X with the variable IRN can be performed by concatenating the variable IRN with itself several times to form a word of the size of the secret data KY and of the input data X. Therefore, in the event that the data X and KY may be encoded on 16 bits, the variable IRN on 8 bits can be concatenated with itself to obtain a word on 16 bits. The operation executed in step S14 may then become:

$$PR[i]=OPR(X,KY \oplus IRN//IRN), \quad (4)$$

"//" representing the concatenation operator of binary words.

In the event that the data X and KY are encoded on 32 bits, each value of the variable IRN on 8 bits may be concatenated with itself 3 times to obtain a word on 32 bits. The operation executed in step S14 may then become:

$$PR[i]=OPR(X,KY \oplus IRN//IRN//IRN//IRN). \quad (5)$$

In fact, the variable IRN used as a mask can have the size of the smallest word processed by the algorithm in which the operation OPR is performed.

In addition, the concatenated values of IRN can be different from each other:

$$PR[i]=OPR(X,KY \oplus IRN1//IRN2//IRN3//IRN4). \quad (6)$$

provided that the indexes where IRNj=0 (j=1, 2, 3, 4) are stored.

Figure 3:
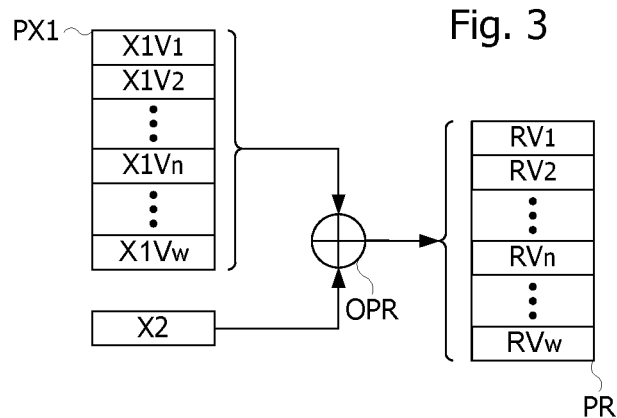
FIG. 3 is a block diagram illustrating protection steps according to an example embodiment.

FIG. 3 illustrates an application of an operation such as XOR to a protected data X1 and a non-protected data X2. The data X1, X2 may have the size of one or several bytes. Accordingly, the data X1 may be represented by an input set PX1 including data X1V1, X1V2, . . . X1Vw, each of these data having the same size as the input data X1, with w=2b where b is the size of the input data. The required data X1 may be at index n in the input set PX1:X1=X1Vn, n being an integer number between 1 and w. The result of the operation may be an output set PR including w distinct output data RV1, RV2, . . . RVw, wherein each data RVj equals X1Vj⊕X2. The expected result of the operation RVn (=X1Vn⊕X2=X1⊕X2) may be at the same index n in table PR as the required input data X1 in the table PX1. Thus, when w distinct data is between 0 and w−1 (as the input set PX1), the resulting output set PR may provide the same level of protection of the expected result RVn as the input set PX1.

Problems may arise when two protected data X1, X2 used in a cryptographic algorithm are combined by an operation such as XOR. For example, the data X1, X2 being protected may be replaced by input sets of data PX1, PX2, wherein each word in each word column in each input set may have the same number of occurrences. Each of the input sets PX1, PX2 can also include all possible data depending on the size of the input data X1, X2, or a part thereof defined by applying a set of masks in the form of Mi// . . . //Mi, with Mi=0, . . . (w−1), Mi having the size of a word, when the input data are processed word by word.

Figure 4:
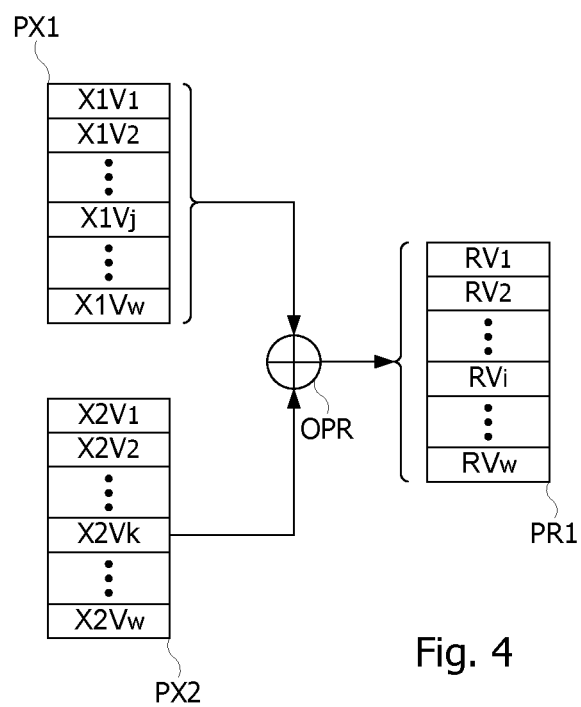
FIG. 4 is a block diagram illustrating protection steps, according to an example embodiment.

FIG. 4 illustrates the sets of input data PX1, PX2. The input set PX1 may include the data X1V1, . . . X1Vw, the required input data X1 (=X1Vn) being at the index n. In a same way, the input set PX2 may include the data X2V1, . . . X2Vw, the required input data X2 (=X2Vn) being at the same index n.

The input sets PX1 and PX2 may be generated by applying different mask values to the required input data X1 and X2:

X1Vj=X1⊕M1j, for all values of the index j in {1, . . . , w}, and

X2Vj=X2⊕M2j, for all values of the index j in {1, . . . , w}.

Thus, an example embodiment to protect the operation (X1⊕X2) is to compute (X1Vj⊕X2Vj) for all values of the index j between 1 and w:

$$(X1 \oplus M1j) \oplus (X2 \oplus M2j)=(X1 \oplus X2) \oplus (M1j \oplus M2j).$$

In fact, it cannot be ensured that the data M1$j$⊕M2$j$ are different from one another for each value of the index j. It may occur that M1$j$=M2$k$ and M1$k$=M2$j$ for particular values of indexes j and k, leading to a set of masking values M1$j$⊕M2$j$ including two identical values M1$j$⊕M2$k$=M1$k$⊕M2$j$.

Thus each word column of the output set PR does not satisfy the condition of including all possible word values (between 0 and (w−1) when X1 and X2 represent bytes). In an extreme case, M1$j$ and M2$j$ may have the same value for each index value j. Therefore:

$$(X1 \oplus M1j) \oplus (X2 \oplus M2j) = (X1 \oplus X2) \oplus 0 = X1 \oplus X2.$$

As a result, each of the w computations returns the same result X1⊕X2 which may be the expected output result. Not only the expected result may not be protected, but also this solution generates a heavy leakage on the expected result since the operation to be protected is performed w times.

Another example embodiment to generate protected output data could be to select one data in one of the input sets PX1, PX2 and to apply the operation to this selected data and to all the data of the other set of input data. As illustrated in FIG. 4, the data X2V$k$ may be selected in the set PX2 and may be combined with all the data in the input set PX1. Thus each resulting data RV$j$ in the output set PR1 is computed as follows:

RV$j$=X1V$j$⊕X2V$k$, with j=1, 2, . . . w, and k having a fixed value. This ensures that the output set PR1 does not include two identical data RV$i$:

$$X1Vj \oplus X2Vk = (X1 \oplus M1j) \oplus (X2 \oplus M2k) = (X1 \oplus X2) \oplus M1j \oplus M2k.$$

in which M1$j$⊕M2$k$ is different from M1$j'$⊕M2$k$ if M1$j$ is different from M1$j'$. However, the computation of the result data RV$j$ in the output data PR1 may require reading a single data X2V$k$ in the data set PX2, whereas all the data in the input set PX1 may be read. In some circumstances, such an unbalanced processing could generate leakages enabling the disclosure of the data X2V$k$. If the chosen data X2V$k$ is equal to the required input data X2 (=X2V$n$), then the leakage may enable the disclosure of the value of the data X2. If another data X2V$k$ (k≠n) in the set PX2 is chosen to be combined with all the data X1V$j$ of the set PX1, it is necessary to store the value of the mask M$k$ such that the chosen data X2V$k$=X2⊕M2$k$.

Figure 5:
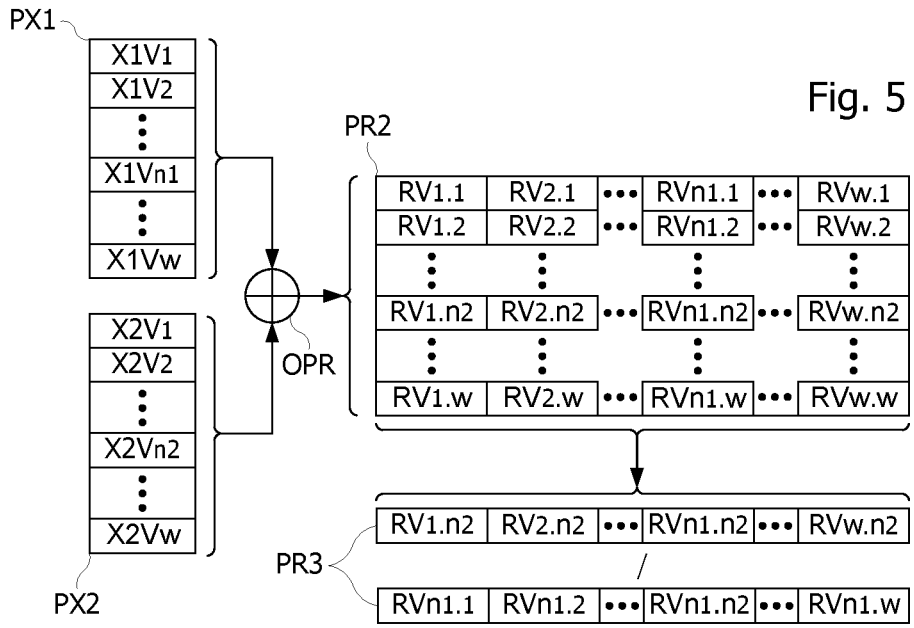
FIG. 5 is a block diagram illustrating protection steps, according to another example embodiment.

In another example embodiment to generate a protected output data, is illustrated in FIG. 5. Referring to FIG. 5, an output set PR2 of the operation X1⊕X2 includes w×w elements RV$i$.$j$, such that:

$$RVi.j = X1Vi \oplus X2Vj$$

with i and j having each all possible integer values between 1 and w.

In some implementations, the computation of the output data RV$i$.$j$ in the output set PR2 may be performed in a random order.

In some implementations, a reduced output set PR3 may be formed from the output set PR2 without altering the protection of the expected output data X1⊕X2, by extracting from the output set PR2 a row J or column I of data RVJ.$i$ or RV$j$.I in the same order. The position of the output data X1⊕X2 in the reduced output set PR3 or the value of the mask M1J or M2I may be stored in order to determine the value of the expected output data.

In some implementations, the required input data X1, X2 can be located in the input sets PX1, PX2 at respective indexes n1, n2. Thus in the example of FIG. 5, the expected result may be located in the row n2 and in the column n1 of the output set PR2:

$$X1 \oplus X2 = X1Vn1 \oplus X2Vn2 = RVn1.n2.$$

The reduced output set PR3 may be formed by extracting from the output set PR2 all the data of the row n2 or the column n1 in the same order. It may be observed that this extraction does not alter the protection of the expected output data X1⊕X2 since the extracted set includes all data between 0 and $2^b-1$ where b is the size of the input data X1, X2. The indexes n1 and n2 may be chosen equal.

Figure 6:
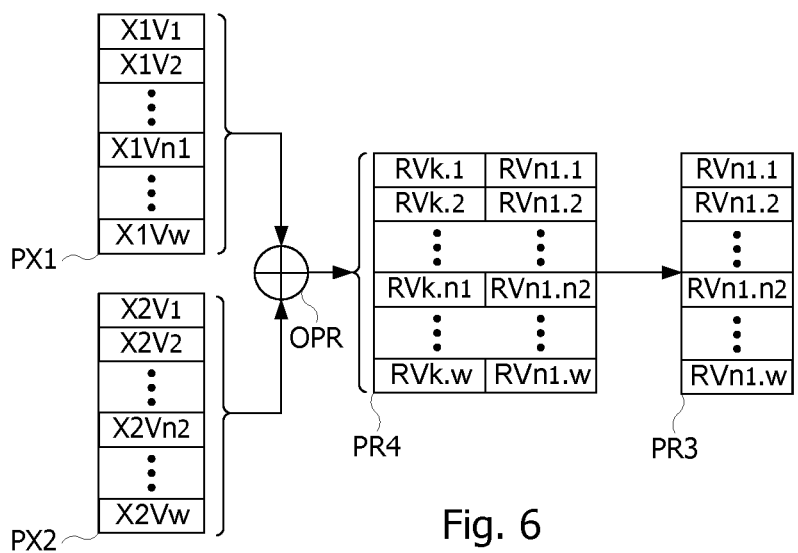
FIG. 6 is a block diagram illustrating protection steps, according to another example embodiment.

In another example embodiment, as illustrated in FIG. 6, a memory PR4 where the data RV$i$.j of the output set PR2 may be written as they are computed only includes two rows or two columns with w data. The computed data RV$i$.j may be written in the memory PR4 such that at the end of the computation, a first one of the two rows or columns equals the row or column of index n of the set PR2, and the other row or column equals another row or column k of the set PR2, for example the last computed row or column (of index w). In case of a computation column by column, the computed columns of data RV$i$.1 . . . RV$i$.w from i=1 to n1 or n2, may be written alternately or randomly in the two columns of memory PR4 or in the same column, and from i=n1+1 (resp. n2+1) to w, the computed columns of data RV$i$.1 . . . (resp. RV$i$.w) may always be written in the column of memory PR4 which does not include the data RVn.1 . . . RVn.w. At the end of the computation, the column including the expected output data RVn1.$n2$ may be extracted from the memory PR4 to obtain the output set PR3.

It could be also observed that if the circuit performing the operation OPR undergoes an error such as one caused by a successful fault injection, the value of at least one data in the output set PR, PR1, PR2, PR3, PR4 may be changed. If only one data is changed, the output table (or a column or a row) may no longer include all possible values of the output data and may include two identical data The data may have a changed value having necessarily the value of another data in the output set. Thus, such a fault injection can be detected by a same value. More generally, a fault injection can be detected looking for two data in the output set, or in a row or column of the output set, having different numbers of occurrences. If two data are changed, the fault injection would fail to be detected only when the values of these two data are swapped, which has a very low probability of occurrence. Due to the property of the XOR operation, an error can be easily detected by combining together by XOR operations all the data in the output set (or in a row or column of the output set) The result of this combination may be equal to zero when each word column of the output set includes all possible values of the output data with the same number of occurrences in relation to the size of the processed words to compute the output data.

In some implementations, each of the computed columns (or rows) of data RV$i$.1 . . . RV$i$.w may be added (XOR) with a previously written column (resp. row) in one column of the memory PR4, except one computed column (or row) of data which is written in the other column of the memory PR4. Thus, due to the property of the XOR operation, the two columns of the memory PR4 must be equal unless an error occurred during the computation of the output data.

In some implementations, the input data X1, X2 may have different sizes. Thus, the input sets PX1 and PX2 may include different numbers of data, e.g., w1 and w2. Therefore, the computed output set PR2 may include w1×w2 output data. Accordingly, the extracted output set PR3 can be the row or column of the output set PR2 including the greatest amount of data including the output data X1⊕X2.

In some implementations, the numbers of occurrences of the data in the input sets PX1, PX2 may be chosen such that the latter include the same number w of data. In this way, the output set PR2 may include w×w data.

Moreover, the data X1, X2 in the above description of FIGS. 3 to 6 can be encoded in one single byte, or in several bytes. In case of a single byte, w equals 256. In case of several bytes and when the operation is performed byte per byte, the masks Mj applied to the data X1, X2 to generate the input sets PX1, PX2 may be chosen to have the form IRN//IRN (IRN being encoded on one byte) when the data X1, X2 are encoded on two bytes, or IRN//IRN//IRN//IRN when the data X1, X2 are encoded on four bytes, or more generally IRN//IRN// . . . //IRN when the data X1, X2 are encoded on more than four bytes.

In some implementations, several words may be computed at the same time in a hardware architecture including wider buses than the size of the data to be processed by the operation, such as 32-bit or 64-bit since XOR operations are bitwise. In a 32-bit architecture, four bytes of the output data RVi.j may be computed at the same time, and in a 64-bit architecture, eight bytes RVi.j may be computed at the same time. In this case, the masks applied to the input data to generate the input data sets may also have the form IRN//IRN// . . . //IRN, IRN being encoded on one byte.

Generally, all the operations performed in AES (Advanced Encryption Standard) algorithm either implemented by software or in hardware can be protected using the exemplary methods previously disclosed.

Figure 7:
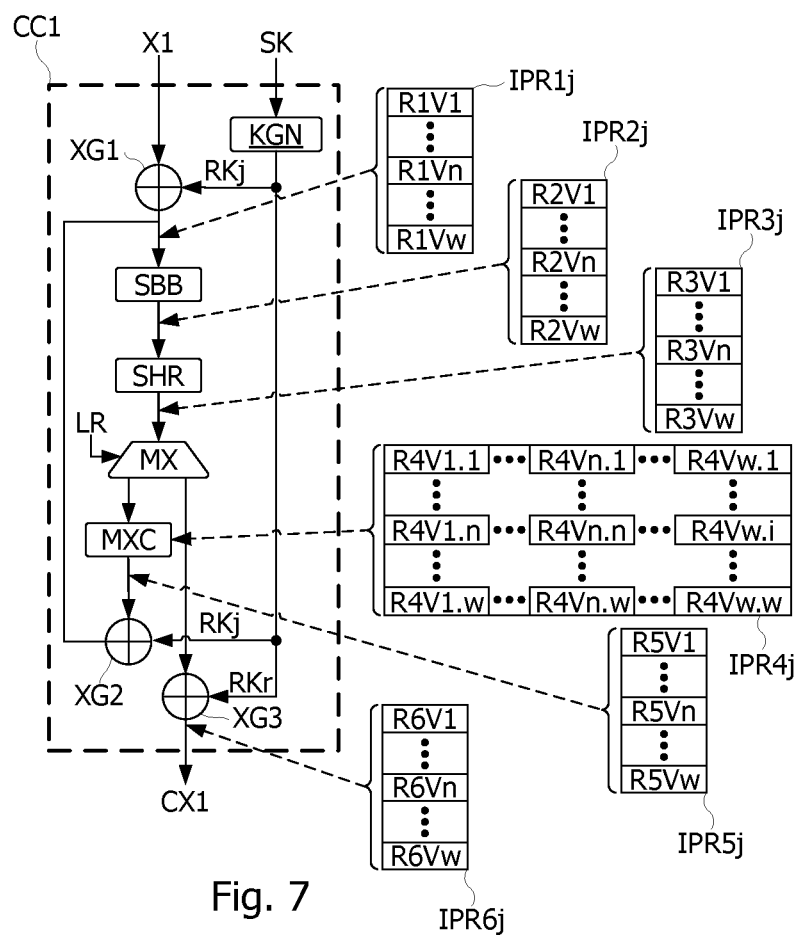
FIG. 7 is a block diagram of an AES encryption algorithm, including protection steps according to an example embodiment.

FIG. 7 illustrates an example of a cryptographic calculation circuit CC1 implementing AES algorithm for encrypting a data. For further details about AES, the document "Advanced Encryption Standard FIPS PUB 197" published on 26 Nov. 2001 can be referred to.

Referring to FIG. 7, the cryptographic calculation circuit CC1 may receive a data X1 to be encrypted and may supply an encrypted data CX1. The circuit CC1 may include circuits XG1, XG2, XG3 performing XOR operations, a substitute calculation circuit SBB, a row-based circular permutation calculation circuit SHR, a column-based permutation calculation circuit MXC, a multiplexer MX, and a key generator KGN. The circuits SBB, SHR, MXC and KGN may be compliant with AES algorithm. The circuit XG1 may receive the data X1 to be encrypted and at a key input a first derived key RK0 generated by the key generator KGN from a secret key SK. The output of the circuit XG1 may be supplied to the circuit SBB. One output of the circuit SBB may be supplied to the circuit SHR. One output of the circuit SHR may be supplied via the multiplexer MX either to the circuit MXC or to an input of the circuit XG3 receiving at a key input a last derived key RKn supplied by the key generator KGN. One output of the circuit MXC may be connected to an input of the circuit XG2 receiving at a key input a derived key RKj (j=1, . . . , r−1) supplied by the key generator KGN. One output of the circuit XG2 may be connected to the input of the circuit SBB. At a last round r, when a certain number (r−1) of calculation rounds have been performed (10, 12 or 14, in accordance with AES) by the chain including the circuits SBB, SHR, MXC, and XG2, the multiplexer MX may be actuated to provide the output of the circuit SHR to the circuit XG3 which may supply the output data CX1.

During a first calculation round, the data X1 may be processed by the circuit XG1 which adds (XOR) to it the first derived key RK0 generated by the circuit KGN from the secret key SK. At each round j, the key generator KGN may derive a new key RKj. The circuit XG1 may provide the resulting data X1⊕RK0 which is processed successively by the circuits SBB, SHR, MXC and XG2. Then the circuit XG2 may combine the data provided by the circuit MXC with the derived key RKj (j=0, . . . , r−1). The circuits SBB, SHR MXC and XG1 may be successively activated for several rounds of AES algorithm. The substitute calculation circuit SBB may be generally implemented using a substitution table.

In some implementations, the operation performed by the circuit XG1 may be realized by executing steps S11 to S17 of FIG. 2. Each of the 16 bytes of the input data X1 may be combined with a respective byte of the key RK0 derived from the secret key SK by the key generator KGN for a first round (j=0) of AES algorithm. The operation OPR in step S14 performed W (=256) times may be a logical XOR operation involving a byte of the input data X1 and a byte of the key RK0. The step S14 may implement one of the equations (1) to (3) or may be derived from these equations by applying equations (4) or (5) depending on the size of the data that the circuit CC1 is able to process. Thus, the result provided by the circuit XG1 may include tables IPR1j (with j=0). Each including words R1V1 to R1Vw and in particular a word R1Vn (with n between 1 and w) may be equal to a word of the output data X1⊕RK0. If one of the equations (1) to (3) is applied alone, the operation XG1 may be applied to each byte of the input data X1 and RK0, and may provide a table IPR10 for each of these bytes, in which the data R1V1 to R1Vw may be bytes. If one of the equations (1) to (3) is applied in combination with equation (4) or (5), the operation XG1 may be applied to each word of two or four bytes in the input data XG1 and RK0 and may provide a table IPR10 of words of the same size for each of these words. An extension of equation (5) can be applied for processing at the same time more than four bytes of the input data to obtain a table including w words of the same size as the processed words of the input data X1. The rank n of each of the output words of the expected result X1⊕RK0 in each of the output tables IPR10 can be different for each output table. Thus, for example, step S11 can be performed for each output table IPR10.

The result provided by the circuit SBB is a table IPR2j (with j=0 at the first round), including data R2V1 to R2Vw and a data R2Vn (with n between 1 and w), equal to SBX[X1⊕RK0] at the first round, SBX being a substitution table implementing the substitution operation of AES algorithm. Generally, circuits SBB and SHR may process the input data X1⊕RK0 byte per byte. In example embodiments, each byte R1V1 to R1Vw in each byte table IPR10 may be processed by the circuit SBB which provides the table IPR20. If each of the data R1V1 to R1Vw represents more than one byte, each byte in the table IPR10 may be processed separately by the circuits SBB and SHR. The circuit SHR may process the tables IPR20 and may provide tables IRPR30.

Figure 8:
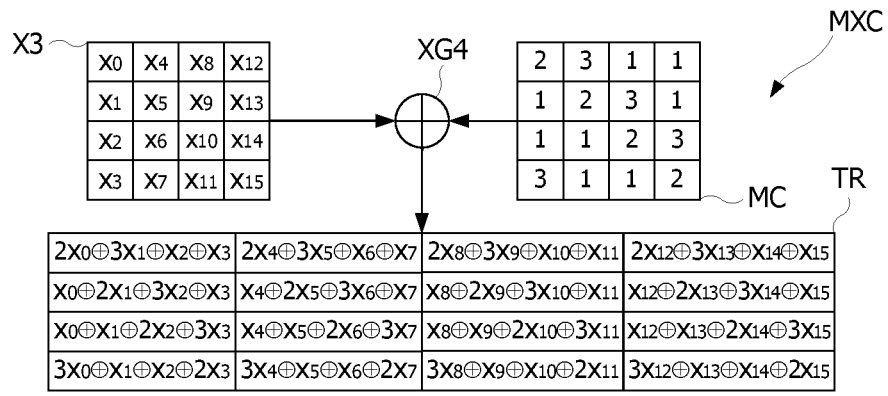
FIG. 8 is a block diagram of a mix column operation in AES encryption algorithm.

FIG. 8 illustrates an example of the circuit MXC in accordance to an example embodiment. The circuit MXC may combine the output data X3 of the circuit SHR with a coefficient matrix MC of 4×4 elements. To this purpose, the output data X3 may be organized into a matrix format of 4×4 elements x0 to x15, each of these elements representing one bytes of the data X3 which is encoded on 128 bits. The elements of the matrix X3 may be combined together by a XOR operator including the elements of the matrix MC to produce a resultant matrix TR of 4×4 elements, where each element has the following form:

$$a \cdot x{<}i{>} \oplus b \cdot x{<}i+1{>} \oplus c \cdot x{<}i+2{>} \oplus d \cdot x{<}i+3{>}$$

where a, b, c, d (=1, 2 or 3) are the elements of one line of the matrix MC and i is equal to 0, 4, 8 and 12. According to AES algorithm, the operation 2·x may be performed by using the operation LS1(x) if x is lower than 128 when the most significant bit (MSB) of x equals 0 and the operation LS1(x)⊕0x1B when the MSB of x equals 1, LS1 representing a shift to the left by one bit in the byte x. The operation 3·x may be performed using the operation 2·x⊕x.

Since each byte of the data X3 is represented by one table IPR3$j$, the circuit MXC may perform 3×16 XOR operations for each byte of each table IPR3$j$. Each XOR operation may combine two input tables as in the cases of FIGS. 4 to 6. One more XOR operation may be necessary to perform the operation 3·x. In other implementations of AES algorithm, the operations 2·x and 3·x may be implemented by lookup tables.

Figure 9:
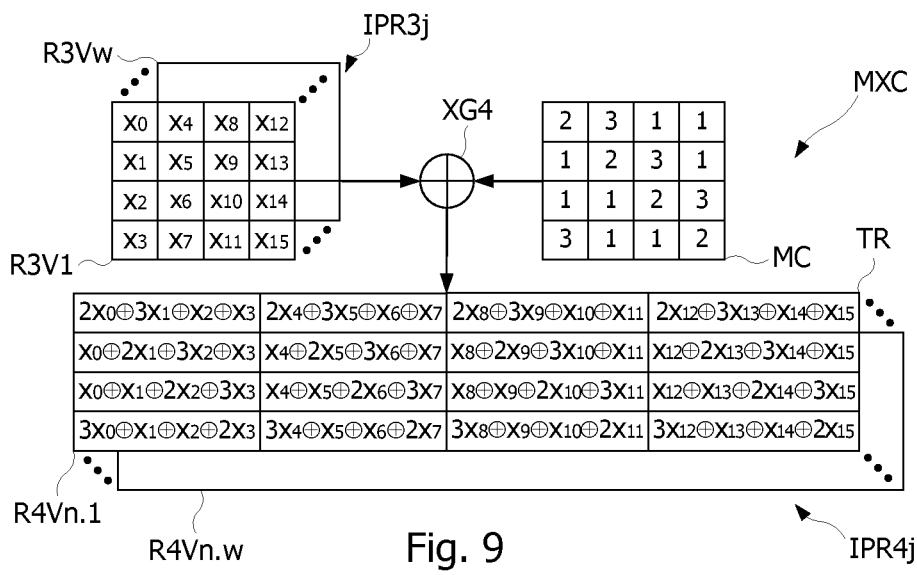
FIG. 9 is a block diagram of a mix column operation in AES encryption algorithm, including protection steps according to an example embodiment.

FIG. 8 is a block diagram of a mix column operation in AES encryption algorithm. FIG. 9 is a block diagram of a mix column operation in AES encryption algorithm, including protection steps according to an example embodiment. Referring to FIG. 9, each XOR operation for computing an element of the matrix TR (as similarly disclosed in FIG. 8) may be performed according to the process illustrated by FIG. 5 or 6, which includes a table similar to the table PR2 or PR4 and to the table PR3, wherein each multiplication by 2 may be performed according to the process illustrated by FIG. 3. After each XOR operation between two input tables IPR30 or between a XOR resulting table IPR40 and another table IPR30, a row or column n including the expected output data at a known rank may be selected in a resulting table IPR40 for a next XOR operation to compute the form a·x<i>⊕b·x<i+1>⊕c·x<i+2>⊕d·x<i+3>. Finally, the computations performed by the circuit MXC may provide, at the first round (j=0), a table IPR40 including w×w bytes (or 2w bytes according to FIG. 6) R3Vi.k for each byte of the input data X1. Then a table IPR50 of w bytes R5Vi (=R4Vi.n or R4Vn.i) may be extracted from each table IPR40. The row or column n where the expected output data may be located at a known rank may be the same or different for each column of the tables IPR40.

At a second round (j=1), the circuit XG2 may combine each of the data R5Vi (i=1, . . . w) in each table IPR50 with a derived key RK1 provided by the circuit KGN, and thus, provides a result table IPR11 including the data R1Vi (i=1, . . . w), to the circuit SBB. Then several rounds may be performed until a table IPR3$r$ is provided by the circuit SHR in a last round (j=r). Then the circuit XG3 may combine each word of each table IPR3$r$ with a last derived key RKr. Finally, the circuit XG3 may provide a result table IPR6$r$ for each word (of 8, 16 or 32 bits) in the input data X1. Each table IPR6$r$ including words R6V1, . . . R6Vw, and more particularly, a word R6Vn of the expected output data CX1. It is noted that if the words of the data X1⊕RK0 are located at rank n in the tables IPR10, the words R6Vn of the expected output data CX1 may be located at the same rank n in the tables IPR6$r$. In some implementations, the circuit XG3 may be configured to provide the data CX1 alone.

The position of the circuits SBB and SHR can be reversed. The a row-based circular permutation calculation performed by the circuit SHR may be applied to the data in the table IPR1$j$ before performing the substitute calculation performed by the circuit SBB, The decryption algorithm according to AES may include substantially the same operations as the encryption algorithm. Therefore, the previously described method for protecting an operation combining one protected data having the form of the table PX1 with another data, either protected or not, can be applied to protect a program and a circuit implementing the AES decryption algorithm. More particularly, an AES decryption circuit may include circuits performing XOR operations with keys derived from the secret key SK, an inverse substitute calculation circuit, an inverse row-based circular permutation calculation circuit, an inverse column-based permutation calculation circuit, and the key generator KGN for generating the derived keys from the secret key SK. The method illustrated in FIG. 3 can be applied to each operation performed by the XOR operations with derived keys, and each operation performed by the inverse substitute calculation circuit, and inverse row-based circular permutation calculation circuit. The method illustrated in FIG. 5 or 6 can be applied to each XOR operation performed by the inverse column-based permutation calculation circuit.

It is noted that the protection method previously disclosed may be applied only to some operations performed in AES algorithm which would be considered as vulnerable to side channel analysis. For example, the protection method can be applied only to the first and last rounds of the AES algorithm, from which sensitive data could leak.

More generally, the protection method previously disclosed can be applied to other encryption algorithms, implemented by software and/or by hardware, and including XOR operations combining sensitive data, such as ARIA). ARIA algorithm may process 128-bit data byte per byte and may be performed by round. Each round may include a round key addition by a XOR operation, a substitution step using two precomputed substitution tables and their inverses and a diffusion step. The substitution step may process byte per byte the input data combined with the round key, and the diffusion step may apply 16 different XOR combinations to the 16 bytes of the data provided by the substitution step. In each of these combinations, seven bytes of the data may be added by XOR operations.

In some implementations, each byte XOR operation performed in the round key addition and each by substitution operation performed in the substitution step may be protected by the process illustrated in FIGS. 2 and 3, and each of the XOR operations performed in the diffusion step may be protected by the process illustrated FIG. 5 or 6.

Figure 10:
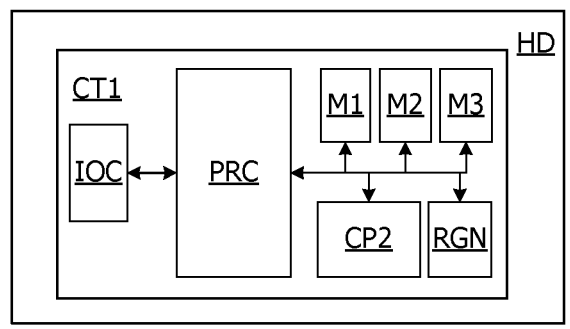
FIG. 10 illustrates a secure circuit, according to an example embodiment.

FIG. 10 illustrates an integrated circuit CT1 arranged on a portable medium HD, such as, for example a plastic card, and implementing one of the protection methods previously described, according to example embodiments. The integrated circuit CT1 may include the same units as the integrated circuit CT described above in connection with FIG. 1, and may differ from the latter in that the co-processor CP1 may be replaced with a co-processor CP2 implementing one and/or the other protection methods described above. According to an example embodiment, the co-processor CP2 may be configured to provide output tables of resulting data, rather than a single data of a cryptographic operation. Each output table may include the expected result of the cryptographic operation. The output table may be all computed words in the word columns, of which the output table may have the same number of occurrences. The processor PRC may be matched with the co-processor CP2 so as to determine the location of the result of the cryptographic operation in the table of resulting values provided by the co-processor CP2.

In some implementations, the co-processor CP2 may also be configured to execute a part of the cryptographic operation. In this case, the processor PRC may be configured to produce output tables of resulting data including the result of the cryptographic operation. Each output table may be all computed words in the word columns, of which the output table may have the same number of occurrences.

In some implementations, the previous examples illustrated in FIGS. 3 to 6, can be applied to other operations than XOR, provided that these operations are performed bitwise and are reversible or bijective.

The methods disclosed herein may also be implemented by software programs executable by a computer system. Further, implementations may include distributed processing and parallel processing, especially for processing in parallel several or all data in the input data sets and/or for providing in parallel several or all data in the output data sets.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

Further, the disclosure and the illustrations are to be considered as illustrative rather than restrictive, and the appended claims are intended to cover all such modifications, enhancements and other embodiments, which fall within the true spirit and scope of the description. Thus, the scope of the following claims is to be determined by the broadest permissible interpretation of the claims and their equivalents, and shall not be restricted or limited by the foregoing description.

What is claimed is:

1. A method for securely performing a cryptographic operation applied to a first input data and a second input data, in a circuit of a cryptographic processing system, the method comprising:
   successively selecting, by the circuit, each data of a first input set and simultaneously each data of a second input set, to form pairs of data associating each data of the first input set with each data of the second input set, the first input set including the first input data, each data in the first input set including at least one word, the words in the first input set having a same size and forming a first word subset including a single word from each data of the first input set and a same number of occurrences of all possible values of the at least one word in the first word subset, the second input set including the second input data, each data in the second input set including at least one word, the words in the second input set having a same size and forming a second word subset including a single word from each data of the second input set and a same number of occurrences of all possible values of the at least one word in the second word subset; and
   computing, by the circuit, output data of an output set, by applying the cryptographic operation to each of the pairs of data, the output set including a result of the cryptographic operation applied to the first input data and the second input data and all data resulting from an application of the cryptographic operation to one of the pairs of data.

2. The method of claim 1, wherein data in the output set are arranged in rows and columns, the data arranged in one of the rows or the columns resulting from the application of the cryptographic operation to a same one data of one of the first input set and second input set and to each of the data in the other of the first input set and second input set,
   the method further including selecting, by the circuit, a row or a column of the output set including an output data of the cryptographic operation applied to the first input data and the second input data.

3. The method of claim 2, wherein the output set is written, by the circuit, in a memory area including two lines of data, one of the two lines of data including the output data and resulting from the application of the cryptographic operation to the first input data and to each of the data in the second input set, or resulting from the application of the cryptographic operation to the second input data and to each of the data in the first input set.

4. The method of claim 3, wherein the rows or columns of the output set are written, by the circuit, randomly or alternately, in the two lines of data in the memory area, and when a row or column of the output set including the output data at a known position is written in one of the two lines of data of the memory area, the other of the two lines of data of the memory area receives all the data of the output set that are subsequently computed by the circuit,
   the method further including:
   selecting, by the circuit, as output of the cryptographic operation, one of the two lines of data of the memory area including the output data, and
   combining, by the circuit, the rows or columns of the output set by XOR operations with previous data written in one of the two lines of data of the memory area, except one row or column of the output set, which is written in the other of the two lines of data of the memory area, an error being detected by the circuit, when the two lines of data of the memory area are not identical.

5. The method of claim 2, further comprising detecting, by the circuit, in one of the columns or rows of the output set a data having a number of occurrences different from a number of occurrences of other data in the output set, an error being detected when two data with different numbers of occurrences are found in the column or the row of the output set.

6. The method of claim 5, further comprising detecting, by the circuit, two identical data in one of the rows or columns of the output set, the detecting of the two identical data including combining, by XOR operations, all data in the row or column of the output set, and comparing a result of the XOR operations with zero.

7. The method of claim 1, wherein the cryptographic operation is an Exclusive OR (XOR) operation.

8. The method of claim 1 wherein computations of the data in the output set are performed by the circuit in random order.

9. The method of claim 1, wherein the first input set is generated by combining, by XOR operations, the first input data once with each possible values of a mask having a same bit number as the first input data.

10. The method of claim 1, further comprising:
   concatenating, by the circuit, a number of data of the first input set to generate a first input word;
   concatenating, by the circuit, the number of data of the second input set to generate a second input word; and
   applying, by the circuit, the cryptographic first operation to the first input word and the second input word.

11. The method of claim 1, wherein the cryptographic operation is included in an encrypting or decrypting operation applied to the first input data, the cryptographic operation including:

applying XOR operations to each byte of the first input data and to a corresponding byte of a key derived from a secret key and providing for each byte of the first input data a first byte output set including a same number of occurrences of all possible values of a byte, the first byte output set including a result of the XOR operations applied to the byte of the first input data;

applying a substitution operation to each byte of each first byte output set, which includes selecting a byte in a substitution table as a function of the byte in the first byte output set, and providing for each first byte output set a second byte output set including all bytes selected in the substitution table; and applying to the bytes of each second byte output set a permutation operation including combining together, by the XOR operations, the bytes of the second output set or multiples thereof.

12. The method of claim 11, wherein each first byte output set is generated by at least one of:

generating a first byte input set for each byte of the first input data by combining, by the XOR operations, the byte of the first input data once with all possible values of a mask byte, and combining each byte of a derived key, by the XOR operations, with each byte of a corresponding first byte input set;

generating a byte key set for each byte of the derived key by combining, by the XOR operations, the byte of the derived key once with all possible values of the mask byte, and combining each byte of the input data, by the XOR operations, with each byte of a corresponding byte key set; or combining, by the XOR operations, each byte of the input data with a corresponding byte of the derived key to generate output bytes, and combining each output byte, by the XOR operations, once with all possible values of the mask byte.

13. A cryptographic circuit, comprising:
a processor configured to:
execute a cryptographic operation applied to a first input data and a second input data;
successively select each data of a first input set and simultaneously each data of a second input set, to form pairs of data associating each data of the first input set with each data of the second input set, the first input set including the first input data, each data in the first input set including at least one word, the words in the first input set having a same size and forming a first word subset including a single word from each data of the first input set and a same number of occurrences of all possible values of the at least one word in the first word subset, the second input set including the second input data, each data in the second input set including at least one word, the words in the second input set having a same size and forming a second word subset including a single word from each data of the second input set and a same number of occurrences of all possible values of the at least one word in the second word subset; and
compute output data of an output set, by applying the cryptographic operation to each of the pair of data, the output set including a result of the cryptographic operation applied to the first input data and the second input data and all data resulting from an application of the cryptographic operation to one of the pairs of data.

14. The circuit of claim 13, comprising a co-processor.

15. The circuit of claim 13, wherein the data in the output set are arranged in rows and columns, the data in the output set of one of the rows or columns resulting from the application by the circuit of the cryptographic operation to a same one data of one of the first input set and second input set and to each of the data in the other of the first input set and second input set, the circuit being configured to select a row or a column of the output set including an output data of the cryptographic operation applied to the first input data and the second input data.

16. The circuit of claim 15, wherein the circuit is configured to write the output set in a memory area including two lines of data, one of the two lines of data including the output data and resulting from the application of the cryptographic operation to the first input data and to each of the data in the second input set, or resulting from the application of the cryptographic operation to the second input data and to each of the data in the first input set.

17. The circuit of claim 16, wherein the circuit is configured to:

write the rows or columns of the output set, randomly or alternately, in the two lines of data of the memory area, and when a row or column of the output set including the output data at a known position is written in one of the two lines of data of the memory area, the other of the two lines of data of the memory area receives all the data of the output set subsequently computed, select as output of the cryptographic operation one of the two lines of data of the memory area including the output data, and combine the rows or columns of the output set are by XOR operations with previous data written in one of the two lines of data of the memory area, except one row or column of the output set, which is written in the other of the two lines of data of the memory area, an error being detected when the two lines of data of the memory area are not identical.

18. The circuit of claim 16, wherein the cryptographic operation is an Exclusive OR.

19. The circuit of claim 16, wherein computations of the data in the output set are performed in random order.

20. The circuit of claim 15, wherein the processor is further configured to detect in a column or a row of the output set a data having a number of occurrences different from a number of occurrences of other data in the output set, an error being detected when two data with different numbers of occurrences are found in the column or the row of the output set.

21. The circuit of claim 20, wherein the circuit is configured to detect two identical data in one of the rows or columns of the output set, the detecting of the two identical data including combining, by XOR operations, all data in the row or column of the output set, and comparing a result of the XOR operations with zero.

22. The circuit of claim 13, wherein the circuit is configured to generate the first input set by combining, by XOR operations, the first input data once with each possible values of a mask having a same bit number as the first input data.

23. The circuit of claim 13, wherein the processor is configured to:
concatenate a number of data of the first input set to generate a first input word;

concatenate the number of data of the second input set to generate a second input word; and
apply the cryptographic operation to the first input word and the second input word.

24. The circuit of claim 13, wherein the cryptographic operation is included in an encrypting or decrypting operation applied to the first input data, the cryptographic operation including:
applying XOR operations to each byte of the first input data and to a corresponding byte of a key derived from a secret key and providing for each byte of the first input data a first byte output set including a same number of occurrences of all possible values of a byte, the byte output set including a result of the XOR operation applied to the byte of the first input data;
applying a substitution operation to each byte of each first byte output set, which includes selecting a byte in a substitution table as a function of the byte in the first byte output set, and providing for each first byte output set a second byte output set including all bytes selected in the substitution table as the function of the byte in the first byte output set; and
applying to the bytes of each second byte output set a permutation operation including combining together, by XOR operations, the bytes of the second output set or multiples thereof.

25. The circuit of claim 24, wherein the processor is configured to generate each of the first byte output sets by at least one of:
generating a first byte input set for each byte of the first input data by combining, by the XOR operations, the byte of the first input data once with all possible values of a mask byte, and combining each byte of a derived key, by the XOR operations, with each byte of a corresponding first byte input set;
generating a byte key set for each byte of the derived key by combining, by the XOR operations, the byte of the derived key once with all possible values of the mask byte, and combining each byte of the first input data, by the XOR operations, with each byte of a corresponding byte key set; or
combining, by the XOR operations, each byte of the first input data with a corresponding byte of the derived key to generate output bytes, and combining each output byte, by the XOR operations, once with all possible values of the mask byte.

26. A device comprising the circuit according to claim 13, and arranged on a medium.

27. A computer program product loadable into a computer memory and including code portions which when executed by a computer configure the computer to carry out a method for executing by a circuit a cryptographic operation applied to a first input data and a second input data, the method comprising:
successively selecting, by the circuit, each data of a first input set and simultaneously each data of a second input set, to form pairs of data associating each data of the first input set with each data of the second input set, the first input set including the first input data, each data in the first input set including at least one word, the words in the first input set having a same size and forming a first word subset including a single word from each data of the first input set and a same number of occurrences of all possible values of the at least one word in the first word subset, the second input set including the second input data, each data in the second input set including at least one word, the words in the second input set having a same size and forming a second word subset including a single word from each data of the second input set and a same number of occurrences of all possible values of the at least one word in the second word subset; and
compute output data of an output set by applying the cryptographic operation to each of the pairs of data, the output set including a result of the cryptographic operation applied to the first input data and the second input data and all data resulting from an application of the operation to one of the pairs of data.

* * * * *

UNITED STATES PATENT AND TRADEMARK OFFICE
CERTIFICATE OF CORRECTION

PATENT NO. : 10,491,372 B2
APPLICATION NO. : 15/636216
DATED : November 26, 2019
INVENTOR(S) : Wurcker et al.

Page 1 of 1

It is certified that error appears in the above-identified patent and that said Letters Patent is hereby corrected as shown below:

In the Claims

In Column 16, Claim 10, Line 66, delete "first operation" and insert -- operation --, therefor.

Signed and Sealed this
Seventh Day of April, 2020

Andrei Iancu
*Director of the United States Patent and Trademark Office*